(12) United States Patent
Matsui

(10) Patent No.: US 11,625,130 B2
(45) Date of Patent: Apr. 11, 2023

(54) TOUCH PANEL DEVICE

(71) Applicant: SHARP KABUSHIKI KAISHA, Sakai (JP)

(72) Inventor: Kuniaki Matsui, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/751,465

(22) Filed: May 23, 2022

(65) Prior Publication Data
US 2022/0382412 A1 Dec. 1, 2022

(30) Foreign Application Priority Data

May 26, 2021 (JP) .............................. JP2021-088474

(51) Int. Cl.
G06F 3/041 (2006.01)
G06F 3/044 (2006.01)

(52) U.S. Cl.
CPC ........ *G06F 3/0443* (2019.05); *G06F 3/04166* (2019.05)

(58) Field of Classification Search
None
See application file for complete search history.

(56) References Cited

U.S. PATENT DOCUMENTS

| 9,417,747 | B2* | 8/2016 | Yumoto | ................ G06F 3/0448 |
| 2016/0224163 | A1* | 8/2016 | Kim | ..................... G06F 3/04184 |
| 2016/0231838 | A1* | 8/2016 | Wang | .................... G06F 3/0443 |
| 2016/0357329 | A1* | 12/2016 | Oke | .................. G02F 1/136286 |

FOREIGN PATENT DOCUMENTS

JP 2010-002949 A 1/2010

* cited by examiner

*Primary Examiner* — Duane N Taylor, Jr.
(74) *Attorney, Agent, or Firm* — ScienBiziP, P.C.

(57) ABSTRACT

A touch panel device includes a plurality of first and second electrode lines, a drive signal generation circuit, a sensing signal receiving circuit, and a drive signal amplifier circuit. The first electrode lines extend in a first direction. The second electrode lines extend in a second direction intersecting the first direction. The drive signal generation circuit generates a drive signal input to the first electrode lines. The sensing signal receiving circuit receives a sensing signal output from the second electrode lines and according to magnitude of capacitance at each of intersection points where the first and second electrode lines intersect each other. The drive signal amplifier circuit amplifies each drive signal input to the first electrode lines. An amplified drive signal amplified with the drive signal amplifier circuit is input to the first electrode lines.

10 Claims, 6 Drawing Sheets

TOUCH PANEL DEVICE

INCORPORATION BY REFERENCE

The present application claims the benefit of priority under 35 U.S.C. 119 based on Japanese Patent Application No. 2021-88474 filed on May 26, 2021, and hereby the disclosure of which is incorporated herein by reference in its entirety.

BACKGROUND

The present disclosure relates to a touch panel device.

Some touch panel is provided with a plurality of first electrodes, a plurality of second electrodes, capacitors, signal generation circuit, and detection circuit. The plurality of first electrodes are orthogonal to the plurality of second electrodes, respectively. The capacitors are formed at intersection points where the first and second electrodes intersect, respectively. The signal generation circuit supplies signals to one of the first and second electrodes sequentially. The detection circuit detects capacitance change in the capacitors and amplifies a detected signal according to the capacitance change and outputs the same.

SUMMARY

According to one aspect of the present disclosure, a touch panel device includes a plurality of first electrode lines, a plurality of second electrode lines, a drive signal generation circuit, a sensing signal receiving circuit, and a drive signal amplifier circuit. The plurality of first electrode lines extend in a first direction. The plurality of second electrode lines extend in a second direction intersecting the first direction. The drive signal generation circuit generates a drive signal to be input to each of the plurality of first electrode lines. The sensing signal receiving circuit receives a sensing signal output from each of the plurality of second electrode lines and according to magnitude of capacitance at each of intersection points where the plurality of first electrode lines and the plurality of second electrode lines intersect each other. The drive signal amplifier circuit is interposed between the drive signal generation circuit and the first electrode lines, and amplifies the drive signal to be input to each of the plurality of first electrode lines. An amplified drive signal that is amplified with the drive signal amplifier circuit is input to the first electrode lines.

DETAILED DESCRIPTION

Figure 1:
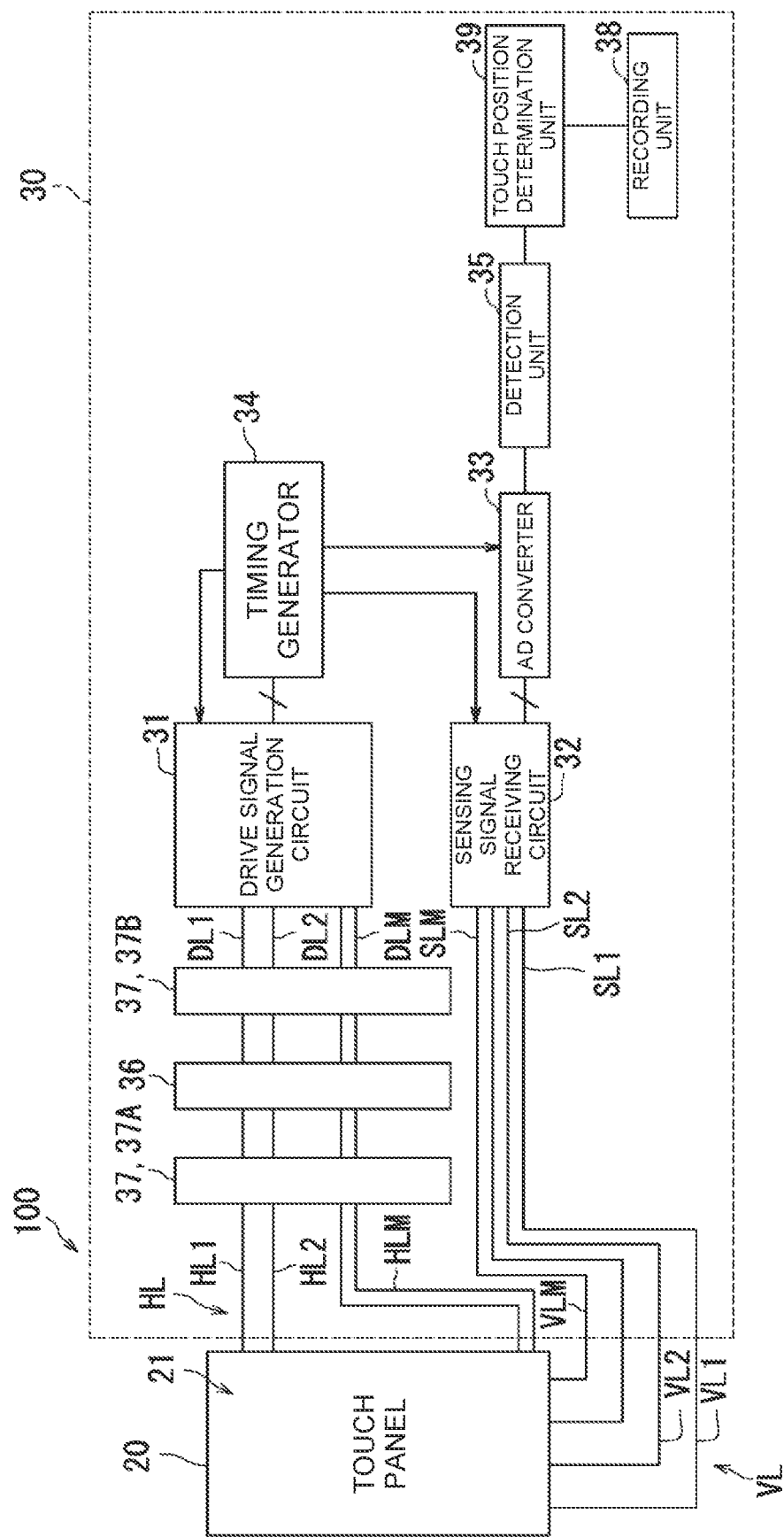
FIG. 1 is a block diagram illustrating the configuration of a touch panel device according to an embodiment of the present disclosure.

Now, an embodiment of the present disclosure is described below with reference to the drawings. The same or equivalent parts in the drawings are denoted by an identical numerical number or sign, and thus repeated description thereof is omitted.

Figure 2:
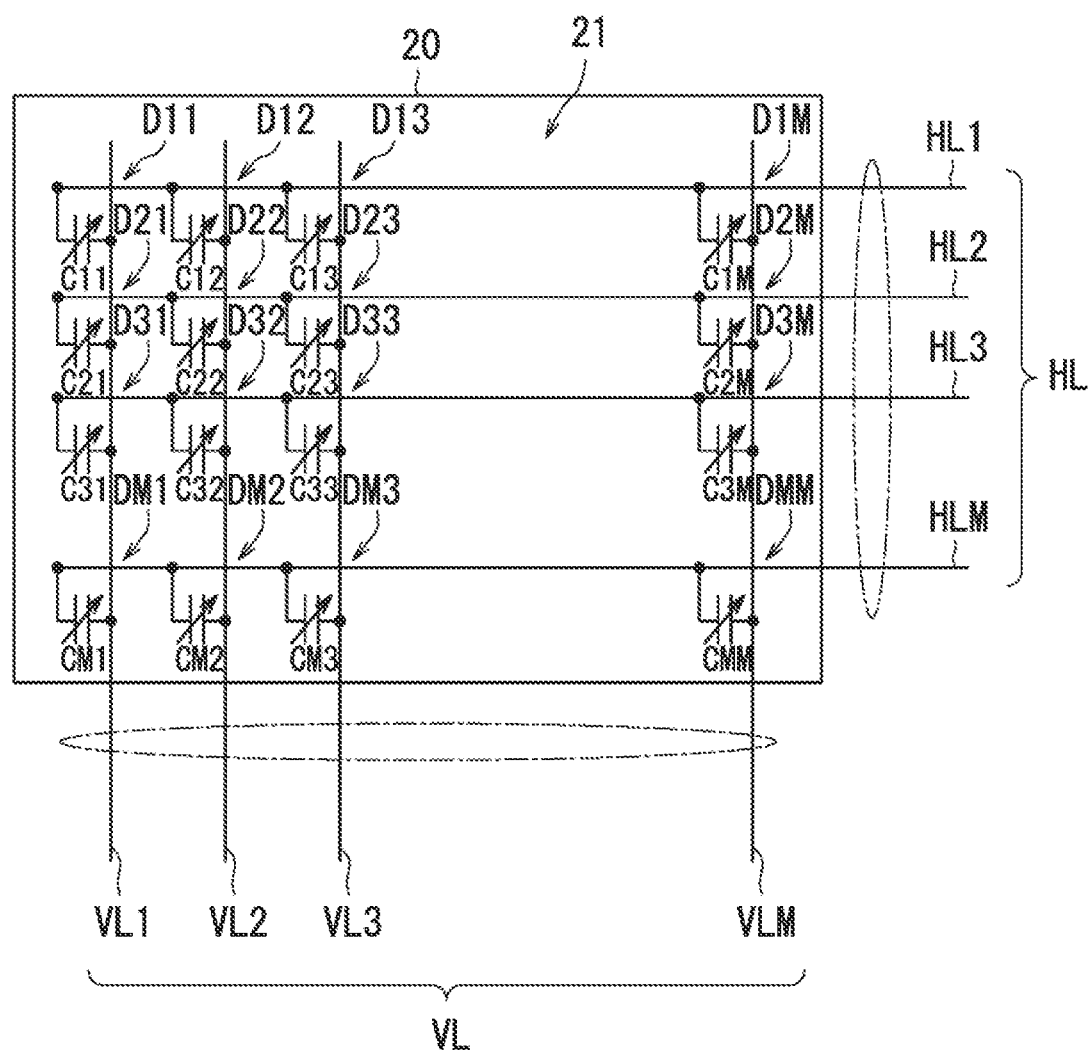
FIG. 2 is a schematic diagram illustrating the configuration of a touch panel provided in the touch panel device according to the present embodiment.
Figure 3:
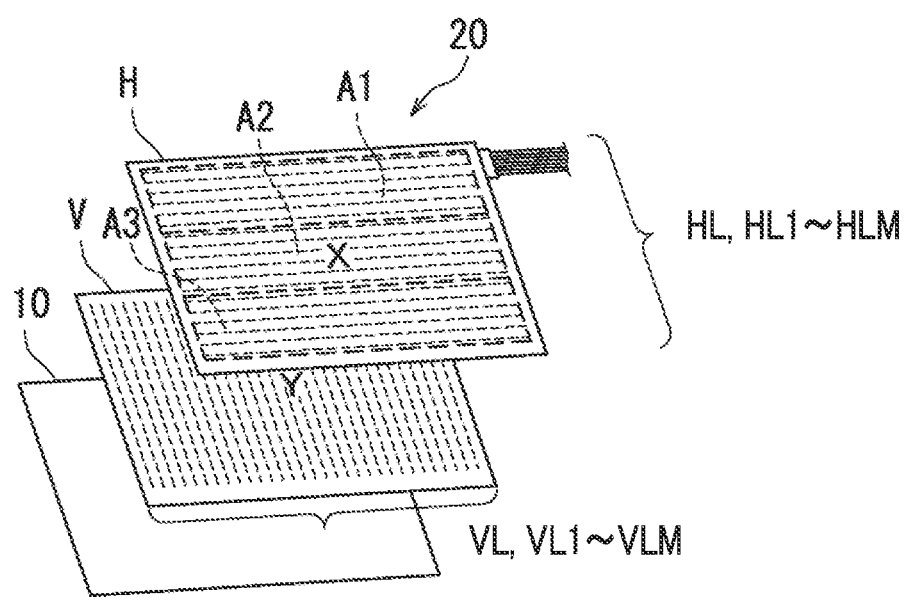
FIG. 3 is an explanatory diagram schematically illustrating the configuration of the touch panel according the present embodiment.
Figure 4:
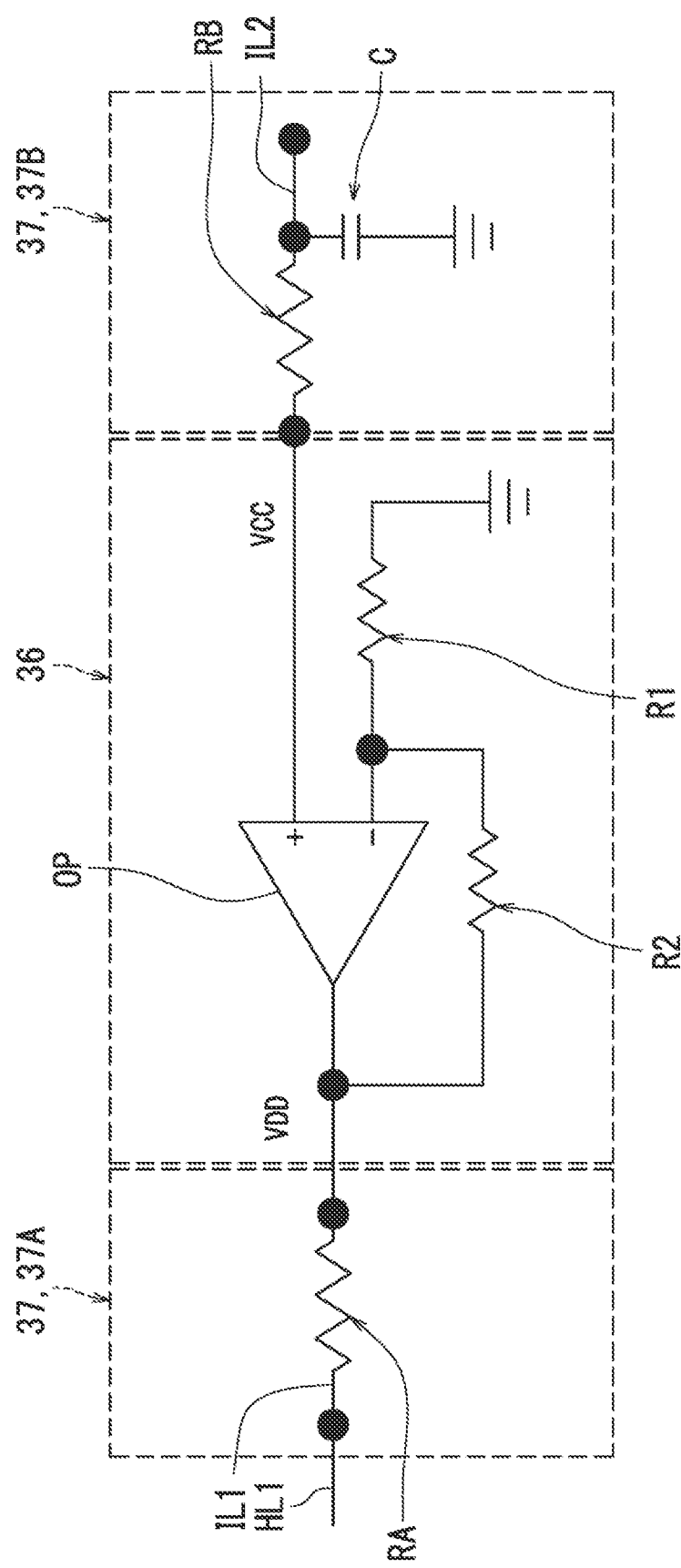
FIG. 4 is a diagram illustrating a drive signal amplifier circuit according to the present embodiment.

Referring to FIGS. 1 through 4, a touch panel device 100 according to the embodiment of the present disclosure is described. FIG. 1 is a block diagram showing the configuration of a touch panel device 100 according to the embodiment of the present disclosure. FIG. 2 is a schematic diagram showing the configuration of a touch panel 20 provided in the touch panel device 100. FIG. 3 is an explanatory diagram schematically showing the configuration of the touch panel 20. FIG. 4 is a diagram showing a drive signal amplifier circuit 36.

As shown in FIGS. 1 through 3, the touch panel device 100 includes display 10, touch panel 20, and touch position determination circuit 30.

The display 10 has a display panel (e.g., liquid crystal panel) which displays images. The touch panel device 100 may not necessarily include the display 10 as long as it includes at least the touch panel 20 and the touch position determination circuit 30. Namely, the touch panel device 100 may not necessarily have image display function to display images on the touch panel 20 as long as it has at least touch panel function.

As shown in FIG. 2, the touch panel 20 has touch surface 21, a plurality of first electrode lines HL, a plurality of second electrode lines VL, and a plurality of capacitances.

The touch surface 21 accepts touch operation. The touch surface 21 may be a touch surface of an electronic blackboard or of a terminal such as a smartphone and a tablet PC (Personal Computer), for example.

The plurality of first electrode lines HL are located on the back side of the touch surface 21. The plurality of first electrode lines HL extend in a first direction. The plurality of first electrode lines HL extend along the first direction and are arranged in parallel with each other along the first direction. The plurality of first electrode lines HL include first electrode lines HL1 to HLM.

The plurality of second electrode lines VL are located on the back side of the touch surface 21. The plurality of second electrode lines VL extend in a second direction. The plurality of second electrode lines VL extend along the second direction and are arranged in parallel with each other along the second direction. The second direction indicates a direction intersecting the first direction. Specifically, the second direction indicates a direction orthogonally intersecting the first direction.

The plurality of second electrode lines VL include second electrode lines VL1 to VLM. The second electrode lines VL1 to VLM are arranged so as to intersect the first electrode lines HL1 to HLM at a plurality of intersection points D11 to DMM, respectively.

The plurality of capacitances include capacitances C11 to CMM. The capacitances C11 to CMM are respectively formed at the plurality of intersection points D11 to DMMs where the second electrode lines VL1 to VLM and the first electrode lines HL1 to HLM intersect each other.

The touch panel 20 including a first electrode line group H and a second electrode line group V is stuck on the display 10 or a protective glass (not shown) and fixed thereto. The second electrode line group V is located closer to the display 10 than the first electrode line group H. Alternatively, the first electrode line group H may be located closer to the display 10 than the second electrode line group V. Practically, a PET film is each provided between the first electrode line group H and the second electrode line group V as well as between the second electrode line group V and the display 10, but it is omitted in the description of FIG. 3.

The touch position determination circuit 30 is composed of semiconductor devices (CPU, memory, etc.), resistors, capacitors, coils, and the like, for example. The touch position determination circuit 30 determines a touch position which indicates a touched position on the touch surface 21 by detecting distribution of values of capacitances C11 to CMM which are respectively formed at the intersection points D11 to DMM between the first electrode lines HL1 to HLM and the second electrode lines VL1 to VLM on the touch panel 20.

When a touch operation is performed on the touch surface 21, capacitance, which is formed at an intersection point located at the periphery of a place where the touch operation is performed among intersection points D11 to DMM, changes. As a result, the touch position determination circuit 30 determines the touch position on the touch surface 21 based on the capacitance change.

The touch position determination circuit 30 includes drive signal generation circuit 31, sensing signal receiving circuit 32, AD converter 33, timing generator 34, detection unit 35, drive signal amplifier circuit 36, recording unit 38, and touch position determination unit 39.

The drive signal generation circuit 31 inputs a drive signal to each of the plurality of first electrode lines HL. The drive signal generation circuit 31 is connected to the first electrode lines HL1 to HLM via the drive signal amplifier circuit 36. The drive signal generation circuit 31 is connected to the drive signal amplifier circuit 36 through drive lines DL1 to DLM. The drive signal generation circuit 31 inputs a drive signal to each of the first electrode lines HL1 to HLM by applying voltage to the first electrode lines HL1 to HLM through drive lines DL1 to DLM.

The sensing signal receiving circuit 32 receives an output signal output from each of the plurality of second electrode lines VL. Specifically, the sensing signal receiving circuit 32 receives a sensing signal according to magnitude of capacitance at each of the intersection points where the plurality of first electrode lines HL and the plurality of second electrode lines VL intersect each other. The sensing signal receiving circuit 32 includes a MOSFET therein.

More specifically, the sensing signal receiving circuit 32 reads out capacitance information corresponding to each of capacitances (each of capacitances C11 to CMM) by detecting the sensing signal from the second electrodes lines VL1 to VLM through sensing lines SL1 to SLM. The capacitance information indicates s linear sum of charges. Then, the sensing signal receiving circuit 32 transmits the read-out capacitance information to the AD converter 33. As a result, the AD converter 33 can acquire the capacitance information.

The AD converter 33 carries out the AD conversion of the capacitance information acquired from the sensing signal receiving circuit 32 and then transmits it to the detection unit 35. As a result, the detection unit 35 can acquire the AD converted capacitance information.

The timing generator 34 controls the drive signal generation circuit 31, the touch position determination unit 39, and the drive signal amplifier circuit 36. The timing generator 34 generates a signal to regulate operation of the drive signal generation circuit 31, a signal to regulate operation of the sensing signal receiving circuit 32, and a signal to regulate operation of the AD converter 33, and then transmits them to the drive signal generation circuit 31, the sensing signal receiving circuit 32, and the AD converter 33, respectively.

The detection unit 35 calculates capacitance distribution on the touch surface 21 based on the capacitance information and code sequence acquired from the AD converter 33. Namely, the detection unit 35 detects detection values (change of capacitance) based on changes of capacitances (capacitances C11 to CMM) formed at each intersection points D11 to DMM where the plurality of first electrode lines HL (first electrode lines HL1 to HLM) and the plurality of second electrode lines VL (second electrode lines VL1 to VLM) intersect, respectively.

The detection unit 35 transmits the detection values (information representing capacitance distribution) to the touch position determination unit 39. As a result, the touch position determination unit 39 can acquire the detection values from the detection unit 35.

The touch position determination unit 39 is electrically connected to the sensing signal receiving circuit 32 via the AD converter 33 and the detection unit 35. The touch position determination unit 39 detects a touch to the touch surface 21 based on the change in the output signal detected by the sensing signal receiving circuit 32, which is attributed to the change of capacitance at the intersection points D11 to DMM. For example, the touch position determination unit 39 determines a touch position on the touch surface 21 based on the distribution of detection values with respect to coordinate of the plurality of intersection points (intersection points D11 to DMM) detected by the detection unit 35 as well as determination conditions recorded in the recording unit 38.

Recording unit 38 records the determination conditions. The determination condition indicates information used by the touch position determination unit 39 in order to determine the touch position on the touch surface 21.

As shown in FIG. 3, the touch surface 21 has first area A1, second area A2, and third area A3. The drive signal generated by the drive signal generation circuit 31 is input to the first electrode line group H, via the drive signal amplifier circuit 36 and the pulse waveform deformation circuit 37 and through cables connected to connection terminals provided on the first area A1. The drive signal input to the first electrode line group H is input to the first electrode lines HL of each of the first area A1, second area A2, and third area A3 with peripheral wiring (routing wires) (not shown) of the first electrode line group H. A length of each of the peripheral wiring is different for the first electrode line HL according to a routing wiring length, and thus the wiring length from the terminal to the first area A1, which is the closest to the terminal, is the shortest, followed by that to the second area A2, and that to the third area A3 is the longest. Furthermore, the more a length of the terminal increases, the more magnitude of an intrinsic time constant of the wiring increases. Therefore, the wiring has a different time constant for each area so that the time constant increases in the following order: the first area A1, the second area A2, and the third area A3.

Generally, magnitude of noise (background noise) is a fixed value, and the smaller the change of capacitance (signal strength) by touch operation becomes, the smaller a ratio of the change of capacitance by touch operation to a noise included in the sensing signal becomes, and thus a signal-to-noise ratio of the sensing signal (signal-to-noise ratio) becomes smaller. Therefore, the signal-to-noise ratio has a tendency to decrease when the change of capacitance by touch operation becomes small, especially when touch operation is performed in a hover state apart a distance from the touch surface 21 or when touch operation is performed in non-dielectric manner. If the signal-to-noise ratio of the sensing signal decreases, the change of capacitance by touch operation is buried into the noise, thereby making it difficult to detect touch operation and reducing detection accuracy. Magnitude of the change of capacitance by touch operation depends on magnitude of the drive signal. Therefore, amplification of the drive signal allows the signal-to-noise ratio of the sensing signal to be improved.

The drive signal amplifier circuit 36 amplifies the drive signal. Specifically, the drive signal amplifier circuit 36 amplifies the drive signal input to each of the plurality of first electrode lines HL. The drive signal amplifier circuit 36 is interposed between the drive signal generation circuit 31 and the first electrode lines HL. Namely, the drive signal amplified by the drive signal amplifier circuit 36 is input to the first electrode lines HL. Therefore, since the drive signal is amplified before it is input to the first electrode lines HL, the signal-to-noise ratio (SN ratio) can be increased. As a result, detection accuracy can be improved even when the signal-to-noise ratio (SN ratio) becomes relatively small.

If the sensing signal output from the second electrode lines is amplified, the signal-to-noise ratio is unimproved because the noise in the sensing signal is also amplified. On the contrary, as the drive signal is amplified in the present embodiment, the noise in the sensing signal is not amplified. Therefore, the signal-to-noise ratio (SN ratio) of capacitance information to the noise can be increased. As a result, even when the change of capacitance by touch operation become small normally, the change of capacitance by touch operation can be increased, thereby reducing deterioration of detection accuracy due to noise.

As shown in FIG. 4, the drive signal amplifier circuit 36 is composed of an analog amplifier circuit. The analog amplifier circuit amplifies a signal of VCC which is an input voltage. Specifically, the analog amplifier circuit amplifies the signal of the input voltage VCC to a signal of VDD which is a maximum voltage. The drive signal amplifier circuit 36 is a non-inverting amplifier circuit. The drive signal amplifier circuit 36 includes operational amplifier OP, resistor R1, and resistor R2. The operational amplifier OP has a non-inverting input terminal (+) and an inverting input terminal (−). An output of a second pulse waveform deformation circuit 37B, which is described later, is connected to the non-inverting input terminal (+) of the operational amplifier OP. An output of the operational amplifier OP is connected to a first pulse waveform deformation circuit 37A which is described later. Furthermore, the output of the operational amplifier OP is connected to the inverting input terminal (−) via resistor R2. The resistor R1 is connected between the inverting input terminal (−) of the operational amplifier OP and ground.

Followed is a detailed description of the touch panel device 100 with reference to FIGS. 1 through 4. The touch panel device 100 is further provided with a pulse waveform deformation circuit 37. The pulse waveform deformation circuit 37 deforms a pulse waveform. In addition, the drive signal is a pulse signal. Pulse waveform deformation circuits 37 are arranged for the plurality of first electrode lines HL, respectively, so as to correspond to the drive signals input thereto The pulse waveform deformation circuit 37 deforms the pulse waveform so that a pulse rise time of the drive signal increases either before or after the drive signal amplifier circuit 36 amplifies the drive signal or both of before and after the drive signal amplifier circuit 36 amplifies the drive signal. This makes it possible to suppress the pulse signal from being steep due to a small pulse rise time.

As a result of verification, the inventor(s) found that new problems may occur, in which simply amplifying the drive signal by the drive signal amplifier circuit 36 results in smaller pulse rise time of the drive signal after amplification than before amplification, and thus the pulse rise becomes too steep, and thereby causing greater leakage current from parasitic diodes formed in the sensing signal receiving circuit 32 than before amplification, as well as smaller signal value of the detection signal (detected value) than expected one. Furthermore, the inventor(s) found that there is such a tendency that the shorter the length of the wiring from the drive signal generation circuit 31 to the first electrode line HL becomes, the shorter the pulse rise time becomes, and the longer the length of the wiring from the drive signal generation circuit 31 to the first electrode line HL becomes, the longer the pulse rise time becomes, and the longer the length of the wiring from the drive signal generation circuit 31 to the first electrode line HL becomes, the smaller the amount of decrease in the signal value of the detection signal becomes, so that there is a problem in which differences in the detected values may cause in the touch panel device 100. The pulse waveform deformation circuit 37 mentioned above is to solve these problems. These problems will be discussed in more detail later.

By increasing the pulse rise time with the pulse waveform deformation circuit 37, it is possible to reduce the leakage current generated in the sensing signal receiving circuit 32 even if the drive signal amplifier circuit 36 amplifies voltage value of the drive signal to a service-life limit of the sensing signal receiving circuit 32. In addition, by reducing the leakage current generated in the sensing signal receiving circuit 32, it is possible to suppress the detected value of the sensing signal from being decreased.

The longer the length of the wiring from the drive signal generation circuit 31 to the first electrode line HL becomes, the smaller the degree to which the pulse waveform deformation circuit 37 increases the pulse rise time becomes. Specifically, the longer the length of the wiring from the drive signal generation circuit 31 to the first electrode line HL becomes, the smaller the degree to which the pulse waveform deformation circuit 37 increases the pulse rise time for each of the drive signals input to the plurality of first electrode lines HL becomes.

Therefore, this makes it possible to suppress differences in the rise time of the pulse waveform attributed to differences of the length of the wiring connected to the first electrode lines HL. Namely, the sum of a pulse rise time regulated with the pulse waveform deformation circuit 37 by a predetermined degree and the pulse rise time attributed to the length of the wiring becomes constant for each of the plurality of first electrode lines HL. As a result, differences in the detected values of the sensing signals can be suppressed.

As shown in FIG. 4, the pulse waveform deformation circuit 37 includes first pulse waveform deformation circuit 37A and second pulse waveform deformation circuit 37B.

The first pulse waveform deformation circuit 37A deforms the pulse waveform of the drive signal after the drive signal amplifier circuit 36 amplifies the same. The first pulse waveform deformation circuits 37A are interposed between the drive signal amplifier circuit 36 and the plurality of first electrode lines HL, respectively. Therefore, rise of the drive signal becoming steep as well as the leakage current from the parasitic diode formed in the sensing signal receiving circuit 32 being increased can be suppressed. As a result, the noise in each of the sensing signals can be suppressed.

As shown in FIG. 4, the first pulse waveform deformation circuits 37A include a plurality of first resistors RA and a plurality of first input signal lines IL1, respectively. The plurality of first resistors RA are connected to the first input signal lines IL1 in series, respectively. The first resistors RA are located between the drive signal amplifier circuit 36 and the first electrode lines HL, respectively. The plurality of first input signal lines IL1 connect the first resistors RA and the first electrode lines HL, respectively. Therefore, by means of the parasitic capacitance in the wiring and the first resistor RA, the first pulse waveform deformation circuit 37A functions as a low-pass filter. As a result, while suppressing decrease of detection accuracy of the touch panel device 100, the pulse waveform can be deformed with the first pulse waveform deformation circuit 37A.

In an electrostatic capacitance type touch panel devices in which capacitors are located in the vicinity thereof, detection accuracy may be decreased. Accordingly, low-pass filters including capacitors are generally not located in the vicinity of the touch panel device.

In the present embodiment, the first pulse waveform deformation circuits 37A are connected to the first electrode lines HL of the touch panel device 100, respectively. Specifically, the drive signal amplifier circuit 36, the first pulse waveform deformation circuits 37A, and the first electrode lines HL are connected in series, respectively. More specifically, the drive signal amplifier circuit 36, the first resistors RA of the first pulse waveform deformation circuits 37A, and the first electrode lines HL are connected in series, respectively. Namely, in the present embodiment, even though the first pulse waveform deformation circuit 37A functions as a low-pass filter, it does not include any capacitor. So it allows the first pulse waveform deformation circuit 37A to be located in the vicinity of the touch panel device 100. Therefore, this makes it possible to suppress the first pulse waveform deformation circuit 37A from decrease in detection accuracy. As a result, it is possible for the first pulse waveform deformation circuit 37A to deform the pulse waveform.

Each of the plurality of first resistors RA has a resistance value whose magnitude corresponds to the degree to which the pulse rise time is increased. Namely, the resistance value of the first resistor RA can be set according to a length of the wiring. Therefore, the resistance values of the plurality of first resistors RA can be individually set so that there are no differences in the rise times of the pulse waveforms. As a result, it is possible to further suppress the detected value of the sensing signal from being decreased depending on a location of the touch position.

In the first pulse waveform deformation circuit 37A, the time constant is defined as the product of the parasitic capacitance in the circuit and the resistance value of the first resistor RA. Furthermore, in the first pulse waveform deformation circuit 37A, the time constant can be changed by changing the resistance value of the first resistor RA. By changing the time constant, the rise time of the pulse waveform can be changed. Therefore, by changing each of the resistance values of the first resistors RA of the plurality of first pulse waveform deformation circuits 37A, the time constant of each of the plurality of first pulse waveform deformation circuits 37A can be set so that there are no differences in the rise times of the pulse waveforms.

The second pulse waveform deformation circuit 37B deforms the pulse waveform of the drive signal before the drive signal amplifier circuit 36 amplifies the same. The second pulse waveform deformation circuit 37B is interposed between the drive signal generation circuit 31 and the drive signal amplifier circuit 36. Therefore, the waveform of the drive signal can be deformed so that signal components unnecessary to amplify are excluded. As a result, a signal to be amplified with the drive signal amplifier circuit 36 can be selected.

The second pulse waveform deformation circuit 37B includes a low-pass filter circuit to eliminate high-frequency components. Therefore, the waveform of the drive signal can be deformed so that high-frequency components unnecessary to amplify are excluded from among the drive signals. As a result, the sensing signal can be detected more accurately.

The second pulse waveform deformation circuits 37B include second resistors RB, capacitors C, and the second input signal lines IL2, respectively. Each of the second input signal lines IL2 is interposed between the drive signal generation circuit 31 and the drive signal amplifier circuit 36.

Each of the second resistors RB is interposed between the drive signal generation circuit 31 and the drive signal amplifier circuit 36. The second resistors RB are connected to the second input signal lines IL2 in series, respectively. In other words, the drive signal generation circuit 31, the second resistors RB, and the drive signal amplifier circuit 36 are connected in series, respectively.

Each of the capacitors C is interposed between the drive signal generation circuit 31 and ground. Each of the capacitors C is connected to the drive signal generation circuit 31 in parallel. The waveform of the drive signal can be deformed so that high-frequency components unnecessary to amplify are excluded from among the drive signals. As a result, the sensing signal can be detected even more accurately.

Each of the second pulse waveform deformation circuits 37B has a time constant whose magnitude corresponds to the degree to which the pulse rise time is increased. The pulse rise time is changed according to the time constant. Therefore, the time constants of the plurality of the second pulse waveform deformation circuits 37B can be individually set so that there are no differences in the rise times of the pulse waveforms. As a result, it is possible to further suppress the detected value of the sensing signal from being decreased depending on a location of the touch position.

The time constant can be changed by changing at least one of the capacitance value of the capacitor C and the resistance value of the second resistor RB. Namely, it is possible to set the time constant such that the pulse rise time becomes one desired by the designer by changing at least one of the capacitance value of the capacitor C and the resistance value of the second resistor RB. The time constant is defined by the product of the capacitance value of the capacitor C and the resistance value of the second resistor RB.

According to the present embodiment, the drive signal generation circuit 31 outputs a plurality of drive signals. The second pulse waveform deformation circuits 37B deform the pulse waveforms of the plurality of drive signals, respectively. Specifically, the second pulse waveform deformation circuits 37B eliminate high-frequency components of the plurality of drive signals, respectively. In addition, the second pulse waveform deformation circuits 37B change the pulse rise times of the drive signals according to the time constants of the second pulse waveform deformation circuits 37B, respectively.

Then, the drive signal amplifier circuit 36 amplifies the plurality of drive signals after waveforms thereof are changed. This allows the signal-to-noise ratio (SN ratio) to become greater. Then, the first pulse waveform deformation circuits 37A deform the pulse waveforms of the plurality of drive signals after the drive signal amplifier circuit 36 amplifies the same, respectively. Specifically, the first pulse waveform deformation circuits 37A deform the pulse waveforms of the plurality of drive signals so that there are no differences in the rise times of the pulse waveforms, respectively. Therefore, it is possible to reduce decrease in the detected value of the sensing signal. As a result, this makes it possible to reduce decrease in the accuracy of touch operation detection.

Next, the pulse waveform deformation circuit 37 is described in more detail with reference to FIGS. 4 through 6.

Figure 5:
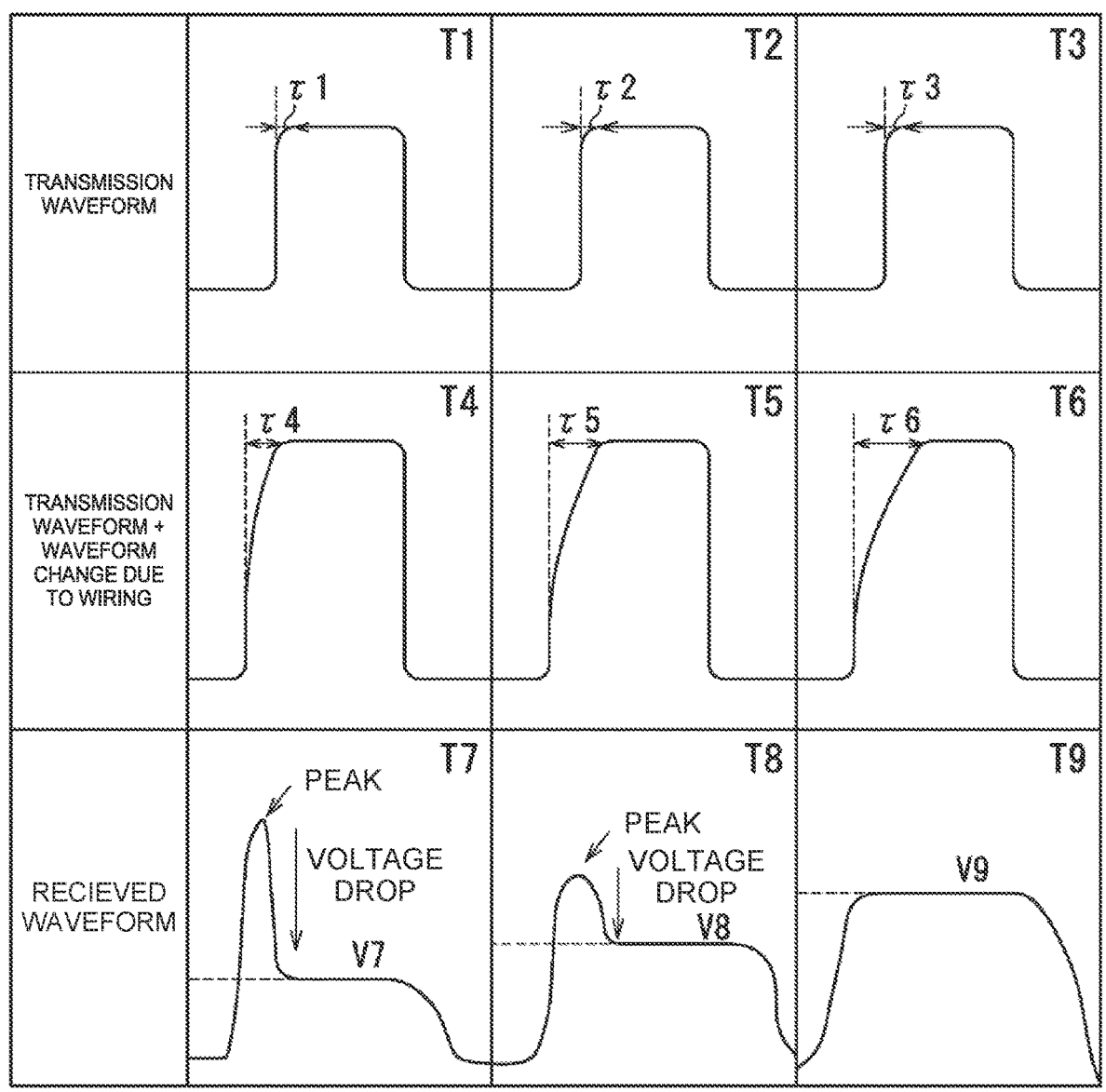
FIG. 5 is a table showing pulse waveforms of drive signals before the pulse waveforms are changed.

FIG. 5 shows Table illustrating the pulse waveforms of the drive signals when there is no pulse waveform deformation circuit 37. Table includes first column T1 through ninth column T9.

As shown in FIG. 5, first column T1, second column T2, and third column T3 indicate input waveforms of the drive signals in first area A1, second area A2, and third area A3, respectively. It should be noted that waveforms shown in the first column T1, the second column T2, and third column T3 indicate waveforms before effects of inherent time constants of the wiring deform the same. Namely, they are the waveforms just after the drive signal generation circuit 31 generates the drive signals for the first area A1, the second area A2, and the third area A3. The waveforms in the first, second, and third columns T1, T2, and T3 are substantially identical (square waves). Furthermore, the rise times of the waveforms of the first column T1, the second column T2, and the third column T3, which are denoted by $\tau 1$, $\tau 2$, and $\tau 3$, respectively, are substantially identical and each have a value of substantially zero.

As shown in FIG. 5, fourth column T4, fifth column T5, and sixth column T6 indicate the waveforms after input waveforms of the drive signals in first area A1, second area A2, and third area A3 shown in the columns T1, T2, and T3 are deformed by the effects of the inherent time constants of the wiring, respectively. Namely, they are the waveforms when the drive signals reach the plurality of first electrode lines HL in the first area A1, the second area A2, and the third area A3, respectively. Compared the waveforms in fourth, fifth, and sixth columns T4, T5, and T6 with those in the first, second, and third columns T1, T2, and T3, the rise times increase from $\tau 1$, $\tau 2$, and $\tau 3$ to $\tau 4$, $\tau 5$, and $\tau 6$, respectively. In addition, magnitude of the inherent time constant of the wiring increases in the order of the first area A1, the second area A2, and the third area A3, so that $\tau 4$, $\tau 5$, and $\tau 6$ have a relationship of $\tau 4<\tau 5<\tau 6$ in magnitude. Namely, when the drive signals reach the plurality of first electrode lines HL, rise of the waveforms is the steepest in the first area A1, followed by a medium level in the second area A2, and the gentlest in the third area A3.

As shown in FIG. 5, seventh column T7, eighth column T8, and ninth column T9 indicate waveforms of the sensing signals in the first area A1, the second area A2, and the third area A3, respectively. The waveform of the sensing signal shown in seventh column T7 corresponds to rise of the waveform shown in fourth column T4, which indicates that first a peak is formed and then a voltage drop causes due to a leakage current. Corresponding to the waveform with the steepest rise shown in fourth column T4, the leakage current becomes the largest in magnitude. The average voltage of the sensing signal corresponding to a receiving strength of the sensing signal is illustrated as V7. The waveform of the sensing signal shown in eighth column T8 corresponds to rise of the waveform shown in fifth column T5, which indicates that first a peak is formed and then a voltage drop causes due to a leakage current. Corresponding to the waveform with a medium level rise shown in fifth column T5, magnitude of the leakage current becomes a medium level, and the average voltage of the sensing signal corresponding to a receiving strength of the sensing signal is illustrated as V8. Since the waveform shown in sixth column T6 has the gentlest rise, the waveform of the sensing signal shown in ninth column T9 indicates that first a peak is little formed and the voltage drop due to the leakage current also becomes the minimum. The average voltage of the sensing signal corresponding to a receiving strength of the sensing signal is illustrated as V7. As mentioned above, magnitude of the leakage current increase in the order of the first area A1, the second area A2, and the third area A3, so that V7, V8, and V9 have a relationship of V7<V8<V9 in magnitude. Namely, magnitude of the receiving strength of the sensing signal increases in the order of the first area A1, the second area A2, and the third area A3, so that differences in the receiving strength of the sensing signal cause among the areas.

Figure 6:
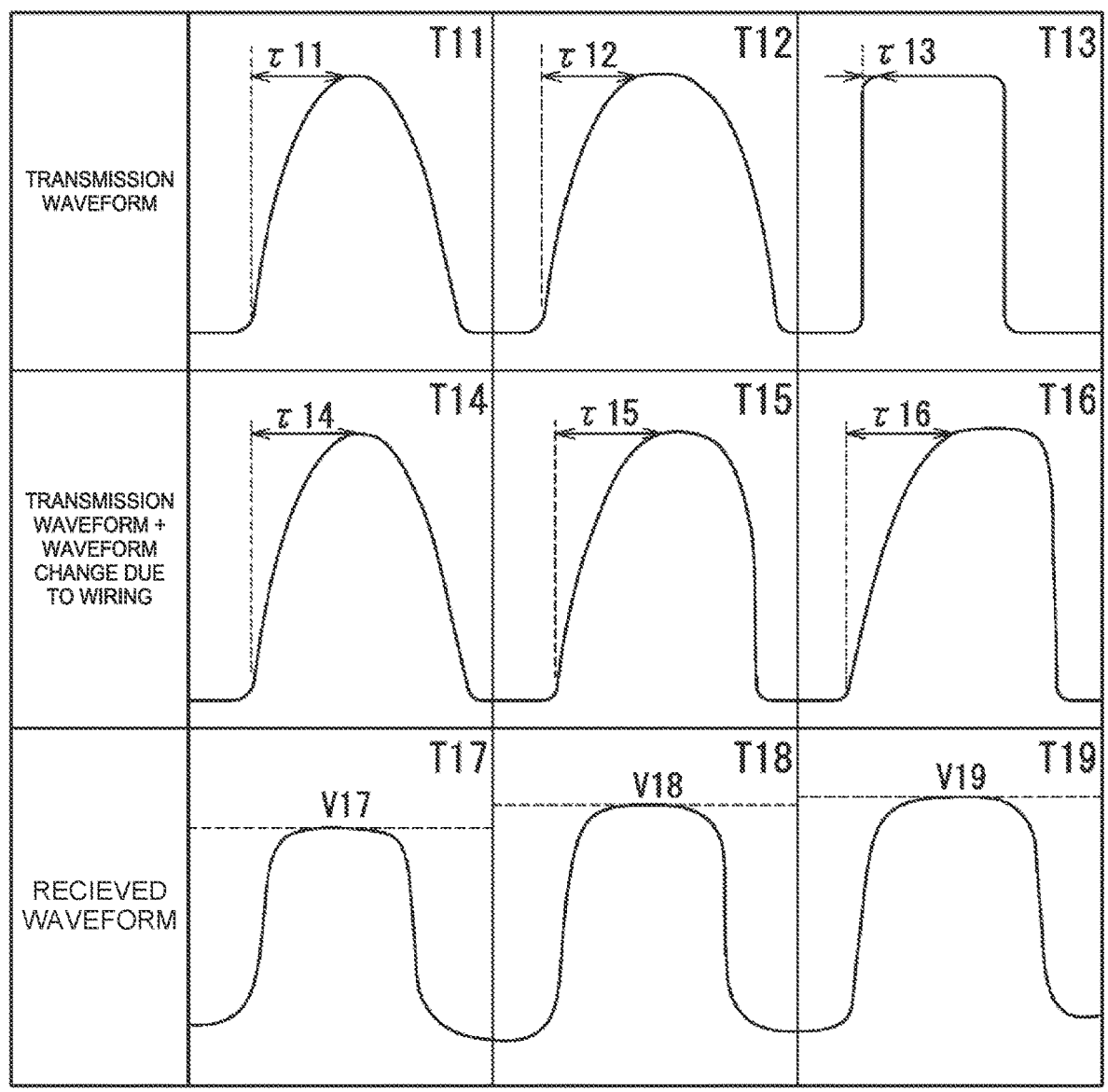
FIG. 6 is a table showing pulse waveforms of drive signals after the pulse waveforms are changed with a pulse waveform deformation circuit.

FIG. 6 shows Table illustrating the pulse waveforms of the drive signals when there are pulse waveform deformation circuits 37. Table includes eleventh column T11 through nineteenth column T19.

As shown in FIG. 6, eleventh column T11, twelfth column T12, and thirteenth column T13 indicate input waveforms of the drive signals in first area A1, second area A2, and third area A3, respectively. It should be noted that waveforms shown in the eleventh column T11, the twelfth column T12, and the thirteenth column T13 indicate waveforms before effects of inherent time constants of the wiring deform the same. Namely, the waveforms shown in eleventh, twelfth, and thirteenth columns T11, T12, and T13 indicate waveforms just after the pulse waveform deformation circuit 37 further deforms the waveforms after the drive signal generation circuit 31 generates the drive signals. The longer the length of the wiring from the drive signal generation circuit 31 to the first electrode line HL becomes, the smaller the degree to which the pulse waveform deformation circuit 37 increases the pulse rise time becomes. Therefore, the rise times of the waveforms of the eleventh column T11, the twelfth column T12, and the thirteenth column T13, which are denoted by $\tau 11$, $\tau 12$, and respectively, have a relationship $\tau 11>\tau 12>\tau 13$ in magnitude. Namely, just after the pulse waveform deformation circuit 37 further deforms the waveforms of the drive signals after the drive signal generation circuit 31 generates the drive signals, rise of the waveform is the steepest in the third area A3, followed by a medium level in the second area A2, and the gentlest in the first area A1.

As shown in FIG. 6, fourteenth column T14, fifteenth column T15, and sixteenth column T16 indicate the waveforms after input waveforms of the drive signals in first area A1, second area A2, and third area A3 shown in the eleventh, twelfth, and thirteenth columns T11, T12, and T13 are deformed by the effects of the inherent time constants of the wiring, respectively. Namely, they are the waveforms when the drive signals reach the plurality of first electrode lines HL in the first area A1, the second area A2, and the third area A3, respectively. Compared the waveforms in fourteenth, fifteenth, and sixteenth columns T14, T15, and T16 with those in eleventh, twelfth, and thirteenth columns T11, T12, and T13, the rise times increase from $\tau 11$, $\tau 12$, and $\tau 13$ to $\tau 14$, $\tau 15$, and $\tau 16$, respectively. As a result, the rise times of the waveforms of the fourteenth, fifteenth, and sixteenth columns T14, T15, and T16, which are denoted by τ14, τ15, and τ16, respectively, become substantially identical.

As shown in FIG. 6, seventeenth column T17, eighteenth column T18, and nineteenth column T19 indicate waveforms of the sensing signals in the first area A1, the second area A2, and the third area A3, respectively. Since rise times of the waveforms in fourteenth, fifteenth, and sixteenth columns T14, T15, and T16, which are denoted by τ14, τ15, and τ16, respectively, become substantially identical value, the waveforms shown in seventeenth, eighteenth, and nineteenth columns T17, T18, and T19 each have a similar waveform. Furthermore, since magnitudes of the leakage currents are substantially identical, the average voltage of the sensing signals, which correspond to the receiving strengths of the sensing signals of the waveforms shown in seventeenth, eighteenth, and nineteenth columns T17, T18, and T19, respectively, become substantially identical. Namely, magnitude of the receiving strength of the sensing signal are substantially identical among the first area A1, the second area A2, and the third area A3, so that differences in the receiving strength of the sensing signal never cause among the areas.

As shown in FIG. 6, fifteenth column T15 corresponds to twelfth column T12. The waveform shown in fifteenth column T15 indicates an output waveform of the drive signal output from the plurality of first electrode lines HL to the second area A2 shown in FIG. 3. The pulse waveform deformation circuit 37 deforms the waveform of the drive signal so that the time constant becomes larger. Namely, the leakage current in the second area A2 becomes smaller. As shown in fifteenth column T15 of FIG. 6, when the leakage current is large, the pulse rise time of the output waveform of the drive signal becomes longer. Namely, the pulse rise of the output waveform of the drive signal never becomes steep.

As shown in FIG. 6, sixteenth column T16 corresponds to column T13. The waveform shown in sixteenth column T16 indicates an output waveform of the drive signal output from the plurality of first electrode lines HL to the third area A3 shown in FIG. 3. The pulse waveform deformation circuit 37 deforms the waveform of the drive signal so that the time constant becomes larger. Namely, the leakage current in the third area A3 becomes smaller. As shown in sixteenth column T16 of FIG. 6, when the leakage current is large, the pulse rise time of the output waveform of the drive signal becomes longer. Namely, the pulse rise of the output waveform of the drive signal never becomes steep.

The embodiments of the present disclosure have been described above with reference to the drawings. The present disclosure is not limited to the above mentioned embodiment, and able to be carried out in various scopes without departing from a range of the gist thereof. In the drawings, for facilitation of understanding and the convenience of depicting, each of main components is schematically illustrated in the drawings, and the thickness, the length, the number, and the like of each of components illustrated in the drawings are different from the actual one. In addition, each component illustrated in the above mentioned embodiment is a merely example, and is not particularly limited thereto, and various changes can be made without substantially departing from a range of the configuration of present disclosure.

The invention claimed is:
1. A touch panel device comprising:
 a plurality of first electrode lines extending in a first direction;
 a plurality of second electrode lines extending in a second direction intersecting the first direction;
 a drive signal generation circuit to generate a drive signal to be input to each of the plurality of first electrode lines;
 a sensing signal receiving circuit to receive a sensing signal output from each of the plurality of second electrode lines and according to magnitude of capacitance at each of intersection points where the plurality of first electrode lines and the plurality of second electrode lines intersect each other; and
 a drive signal amplifier circuit that is interposed between the drive signal generation circuit and the plurality of first electrode lines, and amplifies the drive signal to be input to each of the plurality of first electrode lines,
 wherein an amplified drive signal that is amplified with the drive signal amplifier circuit is input to each of the plurality of first electrode lines.

2. The touch panel device according to claim 1, wherein the drive signal is a pulse signal, and the touch panel device further comprising
 a pulse waveform deformation circuit that is disposed corresponding to each of the plurality of first electrode lines, and deforms a pulse waveform of the pulse signal so that a pulse rise time of the drive signal is increased, at least one of before and after the drive signal amplifier circuit amplifies the drive signal.

3. The touch panel device according to claim 2, wherein the longer a length of wiring from the drive signal generation circuit to the first electrode line becomes, the smaller degree to which the pulse waveform deformation circuit increases the pulse rise time for the drive signal input to the plurality of first electrode lines becomes.

4. The touch panel device according to claim 2, wherein the pulse waveform deformation circuit includes a first pulse waveform deformation circuit that is interposed between the drive signal amplifier circuit and each of the plurality of first electrode lines and deforms a pulse waveform of the amplified drive signal resulting by the amplification of the drive signal by the drive signal amplifier circuit.

5. The touch panel device according to claim 4, wherein the first pulse waveform deformation circuit includes a plurality of a first resistors connected in series to a first input signal line disposed between the drive signal amplifier circuit and the plurality of first electrode lines.

6. The touch panel device according to claim 5, wherein each of the plurality of first resistors has a resistance value with magnitude corresponding to the degree to which the pulse rise time is increased.

7. The touch panel device according to claim 2, wherein the pulse waveform deformation circuit includes a second pulse waveform deformation circuit that is interposed between the drive signal generation circuit and the drive signal amplifier circuit and deforms the pulse waveform of the drive signal before the drive signal is amplified with the drive signal amplifier circuit.

8. The touch panel device according to claim 7, wherein the second pulse waveform deformation circuit is a low-pass filter circuit that eliminates high-frequency components.

9. The touch panel device according to claim 8, wherein the second pulse waveform deformation circuit includes:
 a second resistor connected in series to a second input signal line disposed between the drive signal generation circuit and the drive signal amplifier circuit; and
 a capacitor connected in parallel to the drive signal generation circuit.

10. The touch panel device according to claim 8, wherein the second pulse waveform deformation circuit has a time constant with magnitude corresponding to the degree to which the pulse rise time is increased.

\* \* \* \* \*